United States Patent

Speech et al.

[15] 3,647,472

[45] Mar. 7, 1972

[54] BEVERAGE MIX

[72] Inventors: Steven R. Speech, St. Paul; Joseph W. Opie, Minneapolis; John A. Bridge, Eden Prairie, all of Minn.

[73] Assignee: General Mills, Inc.

[22] Filed: May 8, 1970

[21] Appl. No.: 35,908

Related U.S. Application Data

[63] Continuation-in-part of Ser. No. 732,026, May 27, 1968, abandoned.

[52] U.S. Cl..........................................99/34, 99/28, 99/30, 99/78, 99/136, 99/192 R
[51] Int. Cl..........................................C12f 1/00, C12g 3/04
[58] Field of Search...............99/28, 29, 34, 30, 78, 136, 99/137, 60

[56] References Cited

UNITED STATES PATENTS

| | | | |
|---|---|---|---|
| 1,781,249 | 11/1930 | Scholl | 99/28 X |
| 1,878,203 | 9/1932 | Turnbow | 99/136 |
| 2,139,836 | 12/1938 | London | 99/136 |
| 2,168,934 | 8/1939 | Haskins et al. | 99/136 |
| 2,927,544 | 3/1960 | Kolander | 99/137 X |
| 3,479,187 | 11/1969 | Atbuckle | 99/60 |

OTHER PUBLICATIONS

Cotton, L., Old Mr. Boston Deluxe Official Bartender's Guide, 1963, Mr. Boston Distiller, Inc. Boston, Mass. (pages 2, 3, 48– 49)

*Primary Examiner*—Lionel M. Shapiro
*Assistant Examiner*—D. M. Naff
*Attorney*—Anthony A. Juettner and L. Me Roy Lillehaugen

[57] ABSTRACT

A nonalcoholic cocktail mix containing ingredients in such proportions that the mix can be stored under subfreezing conditions, in a frozen slush form. A chilled beverage, such as a cocktail, is prepared by combining and stirring a packet containing a predetermined amount of the frozen slush with a prescribed amount of at least one other ingredient, such as an alcoholic distillate.

9 Claims, No Drawings

BEVERAGE MIX

This is a continuation-in-part of application, Ser. No. 732,026, filed on May 27, 1968, now abandoned.

The present invention relates to a beverage mix, and more specifically to a liquid-containing, nonalcoholic beverage mix, packaged in predetermined amounts which can be stored under freezing temperature conditions, in a frozen slush form, and which can be combined with a selected alcoholic distillate or a selected nonalcoholic liquid ingredient, to form a chilled cocktail or beverage without the addition of other ingredients.

While the present mix invention can be used for making a variety of chilled beverages, it has been found that it can be used for making alcoholic cocktails with excellent results. As known, alcohol containing beverages are commonly prepared by using a variety of techniques, procedures and ingredients. Perhaps one of the simplest and most common procedures for forming an alcoholic beverage involves combining and mixing a selected alcoholic distillate with a flavored carbonated mix and a desired amount of ice. Cocktails containing alcohol are ofttimes prepared by combining the alcohol with a noncarbonated mix, mixing the ingredients, and chilling with ice. Frozen mix concentrates, and dry powdered mixes, have also been used for forming cocktails. The former is usually permitted to thaw, diluted with water, combined with a selected alcoholic distillate, and chilled with ice; while the latter is combined with water, alcohol, and ice to form the cocktail.

All of the above types of drink formation techniques have certain disadvantages. In most instances the amount of the flavored liquid mix which is used to form the beverage or cocktail, must be separated and measured from a relatively large container, and the container must then be re-covered and stored for future use. This sometimes presents storage and shelf life stability nuisances and problems. Furthermore, in most instances the ice which is used to cool or chill the drink must be added either in cube form or crushed form, to the beverage or cocktail ingredients; this requires that the ice cubes be obtained, that ice-crushing equipment be available, and the like. Finally, as pointed out above, in some instances the mix must be diluted and/or reconstituted with water, for example when a frozen concentrate or a powdered mix is used, in order to provide a cocktail having the proper ratio of ingredients. All of the above factors affect to some extent, the optimum flavor requisites (e.g., through improper amounts of ingredients) and the overall optimum convenience often desired.

Accordingly, one object of the present invention is to provide a beverage mix for making a chilled beverage.

Another object is to provide a liquid-containing mix which can be combined with at least one other liquid ingredient to form a chilled beverage without the addition of ice.

Another object is to provide a liquid-containing cocktail mix which can be combined with an alcoholic distillate to form a chilled cocktail without the addition of ice or other ingredients.

A further object is to provide a prepackaged, liquid-containing, nonalcoholic cocktail mix which remains in a frozen slush form when stored under subfreezing conditions.

A still further object is to provide a liquid-containing beverage mix which can be stored in a home freezer, and which can readily and conveniently be made into a chilled beverage with a minimum amount of effort and a maximum amount of convenience.

Another object is to provide a cocktail mix having improved shelf life stability whether in a frozen or nonfrozen condition.

Other objects and advantages of this invention will become apparent from a consideration of the following detailed description of the invention.

In general, the invention involves forming a nonalcoholic liquid beverage mix containing a number of cryoscopic modifying ingredients in such amounts and proportions that when stored under freezing conditions, the resultant liquid mix is converted to a frozen slush, or soft ice form. The mix is packaged in predetermined quantities so that the contents of a single package when converted to a frozen slush, can be combined with a prescribed amount of a liquid ingredient, such as water, or a selected alcoholic distillate to form a chilled beverage or cocktail, without the addition of ice cubes or other ingredients.

Under normal conditions, the prepared beverage mix is stored under temperature conditions existing in most home freezers, for a period of time before it is used so that it changes from a liquid to a semifrozen or slush condition. It might be pointed out that it can also be stored at room temperature for an indefinite period of time as well, before freezing. It must be stored under freezing conditions prior to use however, so that it is transformed into a frozen slush condition. Generally, temperatures in most home freezers might normally range from about $-15°$ to $+10°$ F. This is the preferred temperature range for storing the mix, as it will remain in a slush form within this general range. It should be pointed out however, that a certain amount of slush will be present at a temperature as high as about 20° F. as well, and that slightly colder temperatures than $-15°$ F. might be tolerated as well. It has been discovered that the ingredients used and their relative amounts with respect to each other is quite important, if the mix is to be maintained in a frozen slush or soft ice form, rather than in a solid frozen state. As used herein, the term "frozen slush" means that both liquid, and ice crystals are present in the mixture. The amount of ice crystals will of course increase as the temperature decreases.

Water comprises the major ingredient of the liquid beverage mix. Generally, the amount of water used in the formulation can vary over a fairly large range, for example from about 60–80 percent of the total mix, and its amount is dependent somewhat on the total amount of the other ingredients in the mix. For best results, it is preferred that the water be low in dissolved gases and salts, particularly chlorine, oxygen, and salts of heavy metals.

Sugar is used in the formulation in fairly large quantities, e.g., up to a maximum of 30–40 percent of the total mix. The sugar is used for two primary purposes; as a cryoscopic modifier because it serves to lower the freezing point of the solution and control the size of the ice crystals when subjected to freezing conditions, and as a sweetener. Both sucrose and dextrose can be used in the formulation. In some instances, sucrose is used as the major sweetening agent, and while the sucrose aids in lowering the freezing point of the solution or mix, it does not function as well in this regard as dextrose, which is a somewhat better cryoscopic modifier. Furthermore, dextrose has lower sweetening characteristics than sucrose. Thus, it has been discovered that a binary mixture of sucrose and dextrose should preferably be used in the formulation, especially when making cocktail mixes. Such a mixture permits the use of a relatively large amount of sugar, without causing the mix to become too sweet, while at the same time lowering the freezing point of the mix to a desired level. In other words, such a mixture renders maximum cryoscopic modification with minimum sweetness. In addition, corn syrup or corn syrup solids might be used as part of the sweetening ingredient, either in addition to, or in lieu of the sucrose or dextrose.

It has been found that the sucrose might comprise about 0–25 percent of the total mix formulation; and that the dextrose might likewise range from about 0–25 percent of the formulation. Generally, the preferred amounts of sucrose and/or dextrose will depend upon the specific product being formed. For some mixes it will be preferred that the sucrose constitute a greater percent than the dextrose, while in other mixes, the reverse will be true. If corn syrup or corn syrup solids are used, the amounts might vary from about 0–10 percent.

Glycerol is also used in the formulation as a cryoscopic modifier because it helps extend the range of cryoscopic modification. In other words, the glycerol helps control the size of the ice crystals and the freezing point of the mix. In this regard, it is preferred that the ice crystals be as small as possible because they melt faster and disperse faster when the beverage is prepared. In addition, the glycerol imparts a relatively small amount of sweetness to the mix. Generally, the amount of glycerol used in the formulation might range from about 0.5-8.0 percent. In cocktail mixes, the amount of glycerol should preferably range from about 3-5 percent; a larger amount than this has a tendency to impart an undesirable taste to a cocktail mix. When used for making mixes for other beverages however, greater amounts of glycerol are preferred and can be tolerated. Other polyols might also be used as cryoscopic modifiers in lieu of the glycerol if desired. Propylene glycol for example, might also be used; it has been found however, that the use of this ingredient is limited to less than about 1 percent, as amounts in excess of this, tend to impart a somewhat bitter flavor to the mix.

Edible acidulents are included in the formulation for imparting a sour taste to the mix, and for lowering the pH of the mix, preferably to a range of about 2.0-4.0 when it is intended for use as a cocktail mix. It has been found that favorable results are obtained by using citric acid, in a range of about 0-4 percent. Other edible acidulents such as tartaric acid, adipic acid, fumaric acid, and malic acid for example, might be used with favorable results as well.

A number of other commercially available ingredients might also be included in the formulation. Such ingredients might include a small amount of a buffering salt such as sodium citrate for example, when citric acid is used as the acidulent. The amount might vary from about 0-0.5 percent. If a different acidulent is used, its corresponding buffering salt should be used, or a base that reacts with the acid to form the salt of that acid.

A small amount of one or more natural or artificial flavoring ingredients derived from citrus fruit such as lime, lemon, or orange, might also be included; as well as other flavorants derived from other sources. The amount of such an ingredient might vary from about 0-1.0 percent, and it can be in liquid or powder form. Preferably, the powdered flavorant is spray dried onto a gum base.

A small amount, e.g., 0-1 percent, of a foaming agent such as hydrolyzed vegetable protein combined with modified cellulose gum, might be included for forming a white head or topping on the cocktail when it is mixed with the alcohol. If preferred, a small amount of an edible glycoside, such as saponin, might be used as the foamant. On the other hand, in some instances it might be preferred to use a small amount of an antifoaming agent in the mix, instead of a foaming agent. In addition, in some instances it might be desired to use a clouding agent, such as an emulsified vegetable oil, or an emulsified brominated vegetable oil, in the formulation.

If a preservative is desired, 0.1 percent or less of sodium benzoate might be included as the preservative. In addition, a very small amount of a general purpose emulsifier might be desired in certain of the mixes; an antioxidant such as erythorbic acid might be included; a thickener such as methylcellulose might be desired; and one or more food dyes or colorants might be included to render a desired color to the mix, and ultimately the beverage. Finally, in some instances, it may be desirable to include a small quantity of carrageenan in certain mixes; such an ingredient seems to help control the crystal size of the ice particles.

It should be recognized that not all of the above ingredients are necessary, and that there may be a number of other ingredients which might be added so as to vary the flavor of the cocktail. The presence of at least water, glycerol, a flavoring ingredient, sucrose, and/or dextrose should be present in various amounts for making a variety of different flavored beverage mixes.

While the general procedure for making the beverage mix might vary, a preferred procedure involves placing the required amount of water in a mixing container or bowl, adding the sucrose, glycerol, and such ingredients as liquid flavorants and the antifoaming ingredient (if included), and slowly mixing the ingredients together. A preblend comprised of the dextrose, powdered flavorants, acidulent, salt, and dyes, is formed separately, and slowly added to and mixed with the ingredients in the mixing container to form a liquid mix. While the dextrose might be added with the sucrose, it serves as a carrier for some of the other ingredients forming the preblend. If a preservative is used, it should preferably be added to the mix before the acidulent; if the acid, e.g., citric acid, is added to the mixture before the preservative, e.g., sodium benzoate, benzoic acid is formed, and it is difficult to disperse and blend with the other ingredients.

The liquid is packaged in individual containers having a prescribed size, e.g., 2 ounces, and stored either at room temperature, or under subfreezing conditions. While the size of the package might vary, it is preferred that the quantity be such that the contents of a single package can be combined with a prescribed amount of a liquid ingredient, such as an alcoholic distillate to form a desired chilled cocktail. It has been found for example, that a package containing about 2 ounces of the mix, when combined with about 1½ ounces of alcohol results in a flavorful cocktail. If a soft drink beverage is desired, the contents of a package or container are combined with a predetermined amount of water for form a chilled beverage. Preferably, the ratio of mix to water of such a soft drink is about three parts of mix to about one part of water. Such a ratio results in a beverage or product which is quite slushy, very cold, and very refreshing; in other words, a chilled, ice crystal-containing product is obtained. For convenience purposes, a narrow, elongated flexible packet might be used; such a packet when filled resembles a somewhat flattened cylinder, which can readily be emptied by opening one end and squeezing the contents out through the open end.

Prior to using the herein described beverage mix, the prepackaged mix is placed in a freezer. As the liquid cools, ice crystals begin to form at a temperature ranging from about 20°-25 F., depending upon the proportions of ingredients used. As noted above, the preferred temperature of most freezers ranges from approximately −15° to +10° F. At this temperature level, the contents within the package remain in a frozen slush form, rather than in a solid frozen state. In other words, the water is formed into small ice crystals, but the syrup comprised of the glycerol, sucrose, and/or dextrose, becomes more concentrated and remains in a nonfrozen state or supercooled condition. By lowering the temperature to approximately −20° to −25° F., the syrup will become unstable with respect to supersaturation, and will begin to form sugar crystals as well; such temperatures however, are colder than normal operating temperatures existing in most home freezers.

When a chilled beverage such as a cocktail is desired, a single package containing the frozen slush mix is removed from the freezer, the package opened, and the contents placed in a cocktail glass, shaker, or blender. Depending on the freezer temperature, it might be expeditious and/or necessary to knead the contents within the package slightly before the contents are removed therefrom; this softens up the slush slightly and permits easier removal from the package. The required amount of alcohol is then placed in the cocktail glass, the contents mixed slightly, garnishments added (if desired), and the cocktail is then ready for serving and consumption. The temperature of such a cocktail might range from about 18°-26° F.; in comparison, cocktails chilled by using ice cubes normally have a temperature ranging from about 28°-30° F.

In a similar manner, a slushy nonalcoholic product is formed by combining the contents of a package containing the frozen slush mix with a relatively small amount of water. For convenience purposes and for illustrative purposes, 6 ounces of the mix are placed in an 8-ounce carton, and then subjected to freezing conditions. By adding 2 ounces of water to the partially frozen contents within the carton, and stirring or mixing with a utensil, a slushy product or beverage is obtained which is ready for consumption.

The invention will be better understood by reference to the following examples:

EXAMPLE I

A whiskey sour cocktail mix was prepared from the following ingredients:

| Ingredients | Percent by Weight |
| --- | --- |
| Water | 65.12 |
| Sucrose | 18.00 |
| Dextrose | 10.00 |
| Glycerol | 4.00 |
| Citric acid | 2.30 |
| Foaming agent | 0.17 |
| Lemon flavoring—powder | 0.16 |
| Sodium citrate | 0.10 |
| Preservative—sodium benzoate | 0.10 |
| Clouding agent | 0.05 |
| Colorant | Trace |

A liquid cocktail mix was formed by combining the water, sucrose, glycerol, preservative, and clouding agent together in a mixing container, and mixing them together until all the ingredients were blended. A preblend, comprised of the dextrose, citric acid, sodium citrate, foaming agent, powdered flavoring, and colorant, was formed and slowly combined with the ingredients in the mixing container. After all the ingredients had been mixed together, the liquid mix was packaged in individual packets containing about 2 ounces of the mix, and the packets were stored in a freezer at a temperature of about −10° F.

A chilled whiskey cocktail was formed by removing one of the packets from the freezer, opening one of its ends, and squeezing the now-frozen slush, into a cocktail glass. One and one-half ounces of whiskey were also poured into the cocktail glass, the ingredients gently stirred, and a red cherry added as a garnishment. The resulting chilled cocktail had a temperature of about 20° F., it had a pleasing flavor, it had a small frothy foam or head adjacent the top surface, and it was simple and convenient to prepare.

EXAMPLE II

A daiquiri cocktail mix was prepared from the following ingredients:

| Ingredients | Percent by Weight |
| --- | --- |
| Water | 64.02 |
| Sucrose | 19.00 |
| Dextrose | 10.00 |
| Glycerol | 4.00 |
| Citric acid | 2.21 |
| Sodium citrate | 0.28 |
| Foaming agent | 0.20 |
| Lime flavoring—powder | 0.12 |
| Preservative—sodium benzoate | 0.10 |
| Clouding agent | 0.05 |
| Lemon flavoring—powder | 0.02 |
| Colorant | Trace |

A cocktail mix was prepared in the same general manner described in Example I. A preblend comprised of the dextrose, citric acid, sodium citrate, foaming agent, lemon and lime flavorants, and colorant, was formed and then added to the other ingredients previously combined and mixed together. The cocktail mix when packaged in 2-ounce packages remained in a frozen slush form when stored at a temperature of about −10° F. A chilled cocktail was prepared by mixing the contents of a packet with 1½ ounces of rum, in the manner described in Example I, to produce a cocktail having an appetizing appearance, and a refreshing and agreeable flavor.

EXAMPLE III

A gimlet cocktail mix was prepared from the following ingredients:

| Ingredients | Percent by Weight |
| --- | --- |
| Water | 64.39 |
| Sucrose | 17.00 |
| Dextrose | 12.00 |
| Glycerol | 4.00 |
| Citric acid | 2.30 |
| Sodium citrate | 0.16 |
| Preservative—sodium benzoate | 0.10 |
| Lime flavoring—liquid | 0.05 |
| Colorant | Trace |
| Antifoamant | Trace |

A gimlet cocktail mix was prepared by combining and slowly mixing a preblend formed of the dextrose, citric acid, sodium citrate, and colorant, with the other ingredients previously blended together. The cocktail mix was packaged in 2-ounce containers, and frozen into a slush form. A vodka gimlet, prepared by mixing the frozen slush ingredients with 1½ ounces of vodka, was considered pleasing and palatable. If preferred of course, gin could have been substituted for the vodka.

EXAMPLE IV

A margarita cocktail mix was prepared from the following ingredients:

| Ingredients | Percent by Weight |
| --- | --- |
| Water | 65.17 |
| Sucrose | 18.00 |
| Dextrose | 10.00 |
| Glycerol | 4.00 |
| Citric acid | 2.30 |
| Sodium citrate | 0.16 |
| Citrus flavoring—liquid | 0.22 |
| Preservative—sodium benzoate | 0.10 |
| Clouding agent | 0.05 |
| Colorant | Trace |

A cocktail mix was prepared by following the same general procedures set forth above, in that a preblend comprised of the dextrose, citric acid, sodium citrate, and colorant, was combined with the other ingredients to form a cocktail mix which was stored in a frozen slush form at about −10° F. A packet of about 2 ounces of the frozen slush was combined with about 1½ ounces of tequila to form a flavorful margarita cocktail.

EXAMPLE V

A daiquiri cocktail mix was prepared from the following ingredients:

| Ingredients | Percent by Weight |
| --- | --- |
| Water | 68.395 |
| Dextrose | 21.000 |
| Sucrose | 5.000 |
| Glycerol | 3.000 |
| Citric acid | 2.000 |
| Foaming agent | 0.130 |
| Sodium citrate | 0.100 |
| Preservative—sodium benzoate | 0.100 |
| Lime flavoring—powder | 0.100 |
| Methylcellulose | 0.070 |
| Lemon flavoring—liquid | 0.050 |
| Clouding agent | 0.030 |
| Erythorbic acid | 0.015 |
| Colorant | 0.010 |

A cocktail mix was prepared by following the same general procedure described above in Examples I & II. As noted in the formulation, a substantially larger amount of dextrose was used and a smaller amount of sucrose was used, than that shown in Example II. A daiquiri cocktail made from a mix comprised of this formulation, did not exhibit quite as sweet flavor characteristics, as one made by using the formulation shown in Example II. In both instances however, satisfactory cocktails were obtained.

EXAMPLE VI

A mai tai cocktail mix was prepared from the following ingredients:

| Ingredients | Percent by Weight |
| --- | --- |
| Water | 68.380 |
| Dextrose | 22.000 |
| Sucrose | 5.000 |
| Glycerol | 3.000 |
| Citric acid | 1.100 |

| | |
|---|---|
| Flavoring | 0.225 |
| Sodium citrate | 0.100 |
| Preservative—Sodium benzoate | 0.100 |
| Clouding agent | 0.070 |
| Erythorbic acid | 0.015 |
| Colorant | 0.010 |

A mai tai cocktail mix was prepared in substantially the same manner described above, after which it was placed in a freezer at about −10° F. A chilled cocktail was thereafter formed by combining a packet of about 2 ounces of the frozen slush with 1½ ounces of rum.

EXAMPLE VII

A Tom Collins cocktail mix was formed from the following ingredients:

| Ingredients | Percent by Weight |
|---|---|
| Water | 68.280 |
| Sucrose | 25.000 |
| Glycerol | 3.000 |
| Citric acid | 2.300 |
| Dextrose | 1.000 |
| Lemon juice | 0.110 |
| Sodium citrate | 0.100 |
| Preservative - Sodium benzoate | 0.100 |
| Lemon Flavoring - powder | 0.90 |
| Erythorbic acid | 0.015 |
| Colorant | 0.005 |

A Tom Collins cocktail was prepared by combining a package containing about 2 ounces of the above frozen slush ingredients with about 1½ ounces of gin.

EXAMPLE VIII

A cherry-flavored beverage mix was formed from the following ingredients:

| Ingredients | Percent by Weight |
|---|---|
| Water | 73.994 |
| Dextrose | 10.000 |
| Corn syrup solids | 8.000 |
| Glycerol | 7.500 |
| Citric acid | 0.260 |
| Preservative - sodium benzoate | 0.100 |
| Sodium citrate | 0.100 |
| Erythorbic acid | 0.015 |
| Cherry flavoring - powder | 0.015 |
| Carrageenan | 0.010 |
| Colorant | 0.006 |

A liquid mix was formed by combining and mixing the water, corn syrup solids, glycerol and preservative together in a mixing container. A preblend comprised of the remaining ingredients was formed and then combined with the ingredients in the mixing container. After all the ingredients had been mixed, the mix was packaged in quantities of about 6 ounces. The mix was stored at room temperature for about 20 days, and about 8 hours prior to its intended consumption, it was placed in a freezer at about −10° F. A chilled slushy cherry-flavored beverage or product was formed by combining 6 ounces of the frozen slush ingredients with about 2 ounces of water. The resulting product remained in a somewhat slushy form for several minutes, it was very cold, and very tasty and refreshing.

The above examples illustrate several specific types of chilled beverages prepared with a minimum amount of effort. In each instance, the beverage was prepared by merely removing a prepackaged amount of a frozen slush beverage mix from a freezer, and combining and mixing it with a prescribed amount of a liquid ingredient. It should be realized that the specific ingredients used in the beverage mixes might vary, and that the specific amount of each ingredient used in a given mix might vary somewhat. As pointed out hereinbefore, certain amounts of water, glycerol, and some sweetening ingredient such as sucrose, dextrose, corn syrup, and/or corn syrup solids, are necessary in order to achieve a liquid mix which will remain in a frozen slush form under conditions existing in a typical home freezer. One or more of certain other ingredients provide the desired flavor characteristics, preservation characteristics, appearance characteristics, and the like.

In the above description, a disclosure of the principles of this invention is presented, together with some of the specific examples by which the invention may be carried out.

Now, therefore, we claim:

1. A process for making a beverage mix composition suitable for combining with at least one other ingredient to form a chilled beverage, which comprises forming a liquid mix from ingredients consisting essentially of 60–80 percent water, an edible cryoscopic modifier, and an acidulent, and at least one flavorant, said cryoscopic modifier consisting of 0–25 percent sucrose, 0–25 percent dextrose, 0–10 percent corn syrup, and 0.5–8 percent glycerol, based on the total mix, said cryoscopic modifier comprising 20–40 percent of the mix, packaging said mix in containers of prescribed size, and subjecting said package mix to freezing temperature conditions, the cryoscopic modifier being present in such proportions that the composition will remain in a frozen slush form within a temperature ranging from about −15° to +20° Fahrenheit.

2. The process of claim 1 wherein said mix includes an acidulent salt, citrus flavoring, and a preservative, said mix being formed by combining and blending a preblend containing at least the dextrose and the acidulent with the other ingredients.

3. A beverage mix composition for combining with an alcoholic distillate to form an alcoholic cocktail, said mix ingredients consisting essentially of water, an edible cryoscopic modifier, an acidulent, and a flavorant, said cryoscopic modifier consisting of 0–25 percent sucrose, 0–25 percent dextrose, 0–10 percent corn syrup, and 0.5–8.0 percent glycerol, based on the total mix; said cryoscopic modifier comprising at least 25 percent of the mix; the presence of said cryoscopic modifier causing the mix to remain in a frozen slush form within a temperature ranging from about −15° to +20° F.

4. The composition of claim 3 wherein it includes a preservative.

5. The composition of claim 3 wherein it includes 0–3 percent citric acid, 0–0.5 percent salt, 0–1.0 percent citrus flavoring, 0–1.0 percent foaming agent, and 0–0.1 percent preservative.

6. The composition of claim 3 wherein it is contained in a flexible packet which permits the ingredients when in a frozen slush form to be kneaded and readily removed from the packet when said packet is opened, the contents of a single packet when combined and mixed with said alcoholic distillate, resulting in a chilled beverage ready for consumption.

7. The product of claim 3 wherein the temperature of the resulting chilled cocktail ranges from about 18°–26° F.

8. The product of claim 7 wherein it includes about 1½ ounces of said distillate and about 2 ounces of said mix.

9. A process for making a beverage mix composition for combining with an alcoholic distillate to form an alcoholic cocktail which comprises forming a liquid mix from ingredients consisting essentially of water, an edible cryoscopic modifier, an acidulent and a flavorant, said cryoscopic modifier consisting of 0–25 percent sucrose, 0–25 percent dextrose, 0–10 percent corn syrup, and 0.5–8.0 percent glycerol, based on the total mix, said cryoscopic modifier comprising at least 25 percent of the mix; packaging said mix in containers of prescribed size; and subjecting said package mix to freezing temperature conditions; the presence of said cryoscopic modifier causing the mix to remain in a frozen slush form within a temperature ranging from about −15° to +20° F.

* * * * *